United States Patent
Yang et al.

(10) Patent No.: US 9,515,727 B2
(45) Date of Patent: Dec. 6, 2016

(54) IN-BAND OPTICAL SIGNAL-TO-NOISE RATIO MONITOR

(71) Applicant: Fujitsu Limited, Kawasaki-shi, Kanagawa (JP)

(72) Inventors: Jeng-Yuan Yang, Garland, TX (US); Youichi Akasaka, Allen, TX (US); Motoyoshi Sekiya, Richardson, TX (US); Takuji Maeda, Kawasaki (JP); Hiroki Ooi, Kawasaki (JP); Satoru Okano, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/639,757

(22) Filed: Mar. 5, 2015

(65) Prior Publication Data
US 2016/0261340 A1    Sep. 8, 2016

(51) Int. Cl.
*H04B 10/079*  (2013.01)

(52) U.S. Cl.
CPC ............................ *H04B 10/07953* (2013.01)

(58) Field of Classification Search
CPC ............ H04B 10/07953; H04B 10/614; H04B 10/6151; H04B 10/6162; H04B 10/6166

USPC .................................................... 398/26
See application file for complete search history.

(56) References Cited

U.S. PATENT DOCUMENTS

| | | | |
|---|---|---|---|
| 7,254,325 B2 | 8/2007 | Hoshida | 398/25 |
| 2004/0114923 A1* | 6/2004 | Chung | H04B 10/07955 398/26 |
| 2008/0124076 A1* | 5/2008 | Rudolph | H04B 10/07953 398/26 |
| 2012/0106951 A1* | 5/2012 | Wan | H04B 10/0775 398/26 |
| 2013/0121691 A1* | 5/2013 | Oda | H04J 14/0221 398/34 |
| 2015/0086212 A1* | 3/2015 | Yu | H04L 5/04 398/116 |
| 2015/0349880 A1* | 12/2015 | Qiu | H04B 10/07953 398/26 |

* cited by examiner

*Primary Examiner* — Dalzid Singh
(74) *Attorney, Agent, or Firm* — Baker Botts L.L.P.

(57) ABSTRACT

Methods and systems for in-band OSNR monitoring include a tunable optical filter to scan a passband of a desired optical channel. The optical power over the passband is measured and digitized to power waveform data. The power waveform data is processed with a digital signal processor to calculate OSNR. Additionally, various implementations accommodate dual polarization modulation formats using a parallel architecture and an alternating sequential architecture.

3 Claims, 11 Drawing Sheets

IN-BAND OPTICAL SIGNAL-TO-NOISE RATIO MONITOR

BACKGROUND

1. Field of the Disclosure

The present disclosure relates generally to optical communication networks and, more particularly, to an in-band optical signal-to-noise ratio (OSNR) monitor.

2. Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

In PSK, the information carried by the optical signal may be conveyed by modulating the phase of a reference signal, also known as a carrier wave. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or 0 and $\pi$) on the constellation diagram; or quadrature PSK (QPSK, 4-PSK, or 4-QAM) using four phases at 0°, 90°, 180°, and 270° (or 0, $\pi/2$, $\pi$, and 3 $\pi/2$). Phases in such signals may be offset. Each of 2-PSK and 4-PSK signals may be arranged on the constellation diagram.

M-PSK signals may further be polarized using techniques such as dual-polarization QPSK (DP-QPSK), wherein separate m-PSK signals are multiplexed by orthogonally polarizing the signals. M-QAM signals may also be polarized using techniques such as dual-polarization 16-QAM (DP-16-QAM), wherein separate m-QAM signals are multiplexed by orthogonally polarizing the signals.

Optical networks may also include various optical elements, such as amplifiers, dispersion compensators, multiplexer/demultiplexer filters, wavelength selective switches, optical switches, couplers, etc. to perform various operations within the network. In particular, optical networks may include costly optical-electrical-optical (O-E-O) regeneration at reconfigurable optical add-drop multiplexers (ROADMs) when the reach of an optical signal is limited in a single optical path.

As data rates for optical networks continue to increase, reaching up to 1 terabit/s (1 T) and beyond, the demands on optical signal-to-noise ratios (OSNR) also increase, for example, due to the use of advanced modulation formats, such as QAM and PSK with dual polarizations. When an OSNR monitor does not measure in-band OSNR for an optical channel, the actual signal quality of the optical channel may not be accurately determined.

SUMMARY

In one aspect, a disclosed method for in-band OSNR monitoring includes receiving a first optical signal for OSNR monitoring, the first optical signal including a first optical channel. The method includes optically filtering the first optical signal to generate an in-band signal over a passband corresponding to the first optical channel. The method further includes measuring an optical power of the in-band signal over the passband. An electrical power signal indicative of the optical power over the passband is generated. The method further includes electrically amplifying the electrical power signal to generate an amplified power signal. The method also includes digitizing the amplified power signal to generate power waveform data, and processing the power waveform data using a digital signal processor to calculate OSNR of the first optical channel.

Additional disclosed aspects for in-band OSNR monitoring include an OSNR monitor, an OADM including an OSNR monitor, and an optical communication system, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
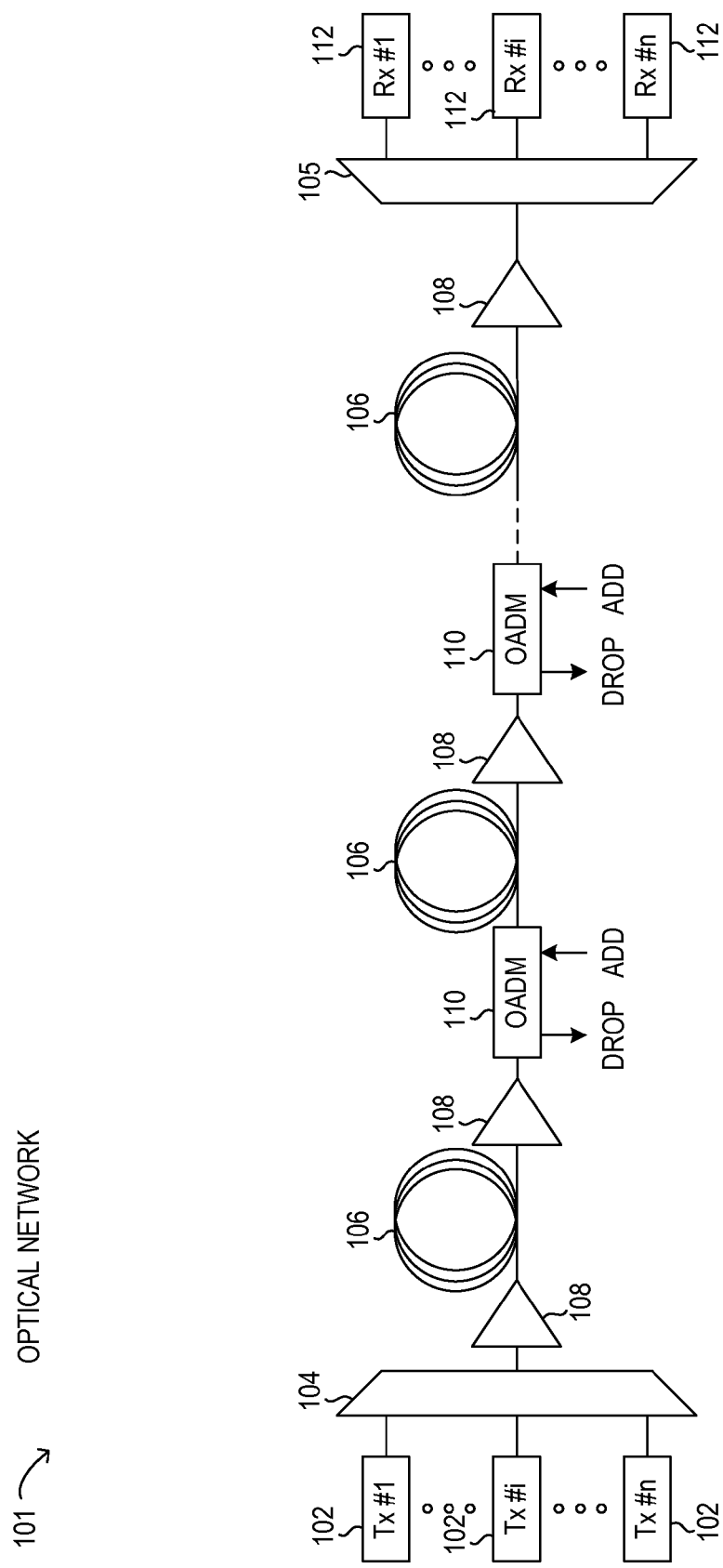
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a "channel" that is included in an optical signal. Each channel may carry a certain amount of information through optical network 101.

To increase the information capacity and transport capabilities of optical network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal.

Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical network 101 may transmit a superchannel, in which a plurality of subcarrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical super-channel may comprise a set of subcarriers that are frequency multiplexed to form a single channel that are transmitted through optical network 101 as one entity. The subcarriers within the superchannel may be tightly packed to achieve high spectral efficiency.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and/or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1 T and beyond a correspondingly high OSNR becomes desirable to maintain economic feasibility by avoiding excessive numbers of O-E-O regenerators. Accordingly, it may be desirable to accurately and instantaneously measure in-band OSNR for a given optical channel transmitted by optical network 101. Such measurement of in-band OSNR may enable real-time monitoring of node-to-node and point-to-point transmission performance of optical network 101 and associated systems and devices. Without an accurate representation of the optical signal quality provided by in-band OSNR measurement, other adverse effects may arise in the optical network. For example, a pre-designed optical reach for the optical channel may not be achieved, which may be undesirable. Thus, OSNR monitoring may enable determining an optical channel's reachability as well as detecting any failure point in optical network 101.

In some embodiments, OSNR monitoring may be included with an OADM node in optical network 101. Industry standards, such as promulgated by the International Telecommunication Union Telecommunication Standardization Sector (ITU-T), suggest that an error of the monitored OSNR should be within ±1 dB accuracy over a wide range of OSNR.

As will be described in further detail, methods and systems are disclosed herein for implementing an in-band OSNR monitor that may provide improved accuracy with in-band OSNR measurements than previous OSNR monitor designs that measure out-of-band OSNR, such as an optical channel monitor (OCM). Typical OCMs use out-of-band noise estimation that relies upon a power difference between a peak signal power and out-of-band noise power, which may not accurately represent the in-band noise, because the in-band noise may be different from the out-of-band noise. In contrast to an OCM, the in-band OSNR monitor disclosed herein may measure in-band noise that represents true noise information that may be different for each optical channel, for example, due to add/drop events affecting each channel individually. The in-band OSNR monitor disclosed herein may be applicable to single-polarization (SP) and dual-polarization (DP) modulation formats. The in-band OSNR monitor disclosed herein may be used with different modulation formats, such as BPSK, QPSK, QAM, and superchannel formats, among others. The in-band OSNR monitor disclosed herein may support optical transmission at data rates of 1 T and beyond. The in-band OSNR monitor disclosed herein may be immune to various system impairments, such as chromatic dispersion (CD), polarization mode dispersion (PMD), fiber nonlinearity, passband narrowing (PBN), frequency offset in a transmitter or an optical filter, and polarization dependent loss (PDL), among other impairments. In certain embodiments, the in-band OSNR monitor disclosed herein may achieve an accuracy of ±0.5 dB with immunity to PBN and frequency offset effects. The in-band OSNR monitor disclosed herein may employ digital signal processing (DSP) that may eliminate input power limitations (or power range limitations) on the monitored channel, because the DSP measures OSNR in the digital domain. The in-band OSNR monitor disclosed herein may employ a tunable optical filter for flexible operation with different channels and formats.

Figure 2:
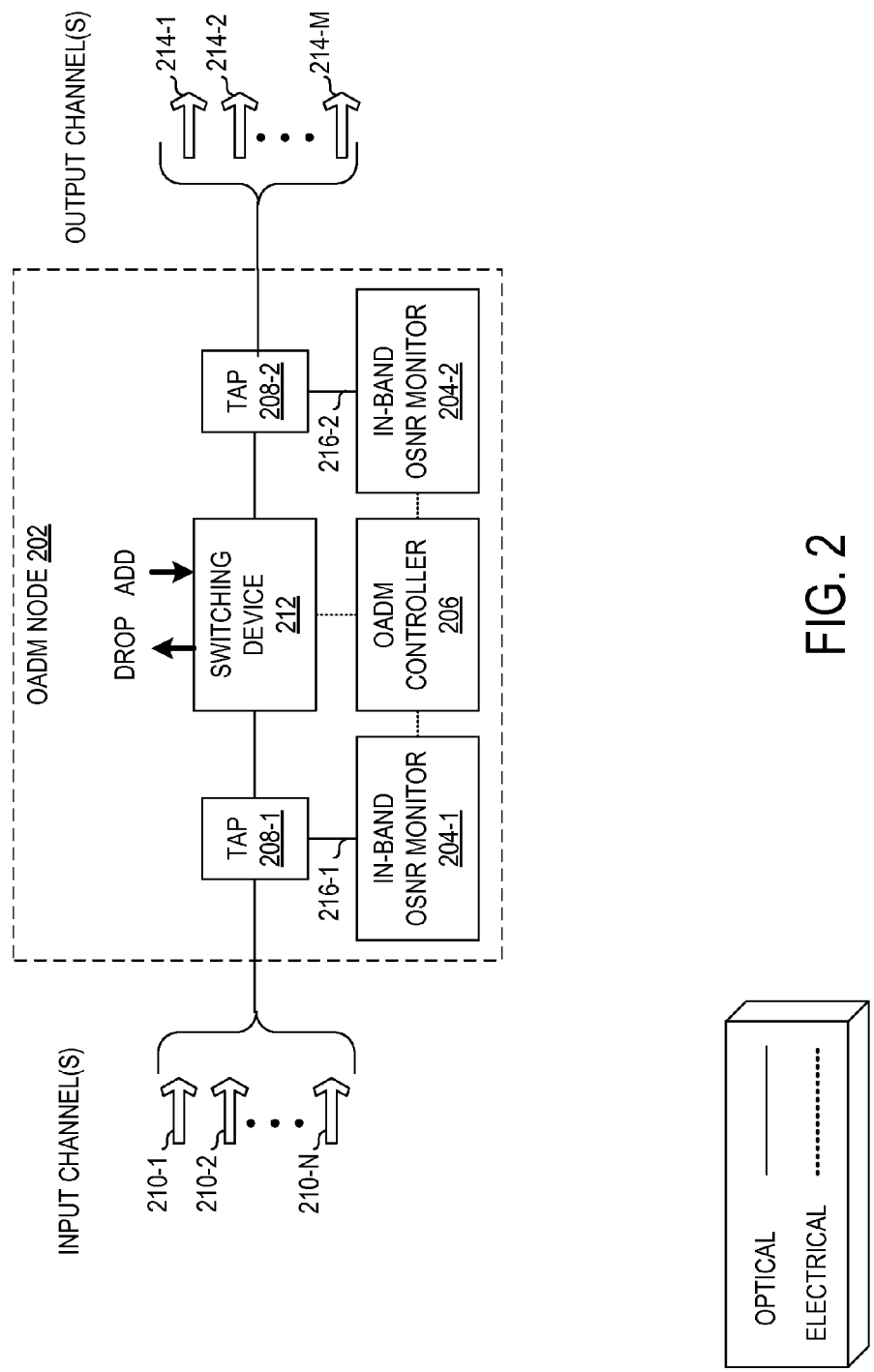
FIG. 2 is a block diagram of selected elements of an embodiment of an optical add drop multiplexer with an in-band OSNR monitoring.

Referring now to FIG. 2, selected elements of an example embodiment of OADM 200 with in-band OSNR monitoring are depicted. As shown, OADM 200 includes OADM node 202, which may represent selected elements of an embodiment of OADM 110 (see FIG. 1). OADM 200 may add or drop optical signals in optical network 101.

In OADM 200, OADM node 202 may receive input channels (i.e., optical signals) 210 and may transmit output channels 214. Input channels 210 and output channels 214 may be in the form of a WDM signal. In certain embodiments, input channels 210 may represent a superchannel. As shown, input channels 210 comprise N number of channels, designated 210-1, 210-2, and so on, up to 210-N. Output channels 214 output by OADM node 202 may comprise M number of channels, designated 214-1, 214-2, and so on, up to 214-M. It is noted that N and M may be different, depending on add/drop events performed by OADM node 202 and may have any value greater than or equal to 1. When N=1, input channels 210 may comprise a single channel, even though input channels 210 is used herein in the plural form. When M=1, output channels 214 may comprise a single channel, even though output channels 214 is used herein in the plural form.

As shown, OADM node 202 includes tap 208 respectively associated with in-band OSNR monitor 204. Tap 208 may divert a portion of the optical signal power that is representative of the optical signal to in-band OSNR monitor 204, such as 5-10% of the optical signal power, shown as power tap signal 216. In-band OSNR monitor 204 may receive power tap signal 216 and output an in-band OSNR value to OADM controller 206. As shown, tap 208-1 provides power tap signal 216-1 to in-band OSNR monitor 204-1 from input channels 210, while tap 208-2 provides power tap signal 216-2 to in-band OSNR monitor 204-2 from output channels 214. OADM controller 206 may be further coupled to switching device 212 that performs optical channel switching to add or drop channels, for example, from other optical network segments. In this manner, OADM node 202 may provide connectivity to different optical networks and network topologies, while monitoring in-band OSNR of input channels 210 and output channels 214.

In operation, in-band OSNR monitor 204 may digitally sample an in-band optical signal for a particular optical channel, as will be described in further detail below, to generate power waveform data. The power waveform data is sampled over a passband corresponding to the optical channel. The power waveform data is then processed by in-band OSNR monitor 204 using a digital signal processor (DSP) to perform waveform to spectrum (or time domain to frequency domain) conversion. Once the frequency spectrum of the power waveform data has been obtained, power integration in the digital domain may be performed to obtain low-pass filtered power, $P_{LPF}$, and band-pass filtered power, $P_{BPF}$. The signal power, $P_{sig}$, may be expressed in terms of $P_{LPF}$, as given by Equation 1.

$$P_{sig} = \frac{P_{LPF} * \Omega}{C_1 \left[1 + \frac{B_o}{R_{res} * OSNR}\right]} \quad \text{Equation 1}$$

In Equation 1, $C_1$ is a calibration constant associated with the low-pass filter, $B_o$ is the optical bandwidth, $R_{res}$ is the measurement resolution which is normally set to 12.5 GHz, and OSNR is the in-band OSNR. Furthermore, $P_{BPF}$ may be expressed in terms of the signal power, $P_{sig}$, as given by Equation 2.

$$P_{BPF} = \quad \text{Equation 2}$$
$$C_2 B_F (P_{sig})^2 + C_3 B_F \frac{2R_{PD}^2}{R_{res}} (P_{sig})^2 \left(\frac{\alpha_1}{OSNR} + \frac{B_o \alpha_2}{2R_{res} OSNR^2}\right)$$

In Equation 2, $C_2$, $C_3$, $\alpha_1$, $\alpha_2$ and $\Omega$ are calibration constants associated with the type of incoming signal and the bandpass filter, $B_F$ is the bandwidth of the bandpass filter, $R_{PD}$ is the optical-to-electrical responsivity of the photo-detector used to sample the optical power, and the remaining terms are the same as in Equation 1. In Equations 1 and 2, the calibration constants are defined in advance, and once the low-pass filtered power, $P_{LPF}$, and the band-pass filtered power, $P_{BPF}$, are measured as described above, OSNR remains the only unknown term. Accordingly, by substituting Equation 1 into Equation 2, OSNR may be calculated.

Figure 3:
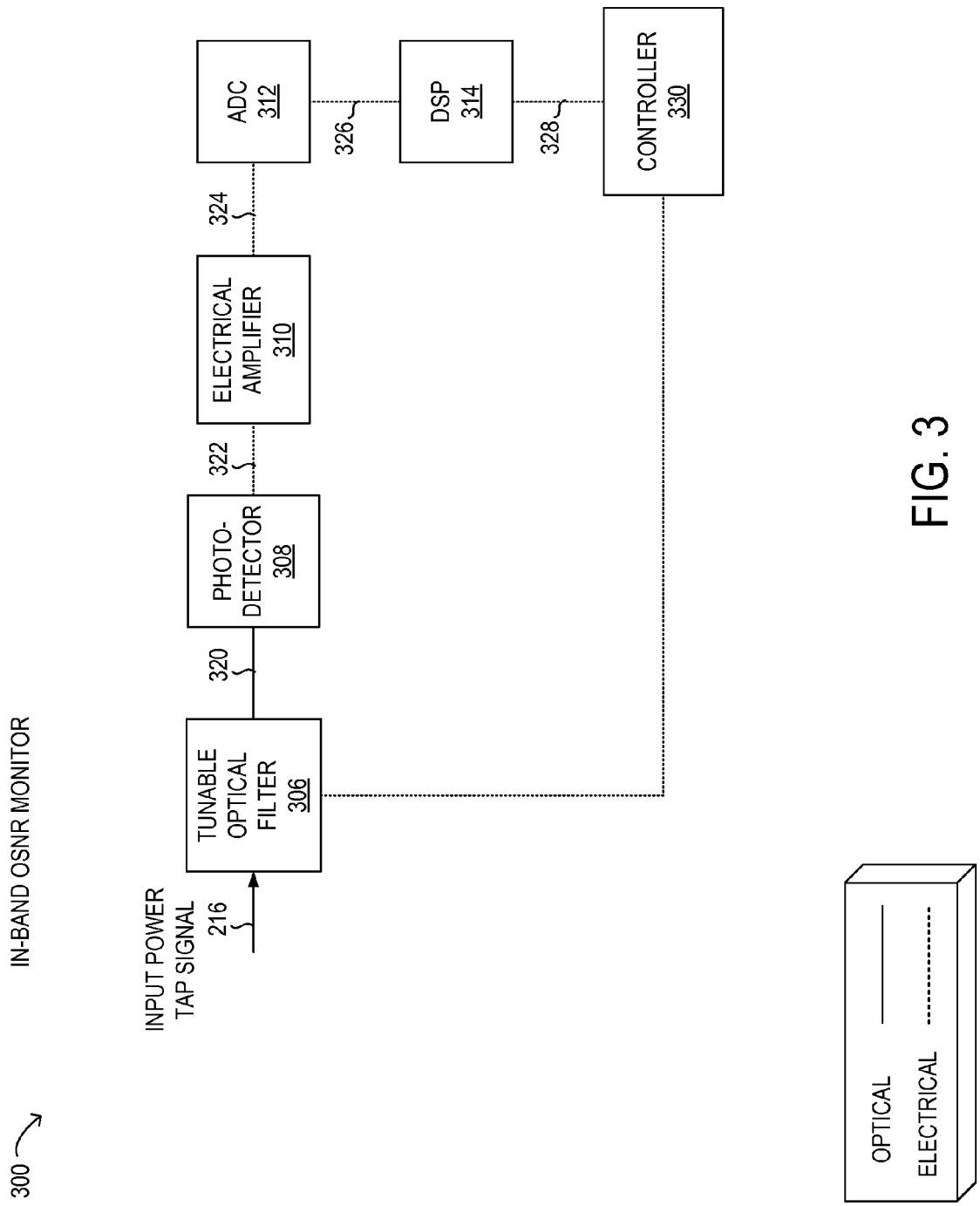
FIG. 3 is a block diagram of selected elements of an embodiment of an in-band OSNR monitor.

Referring now to FIG. 3, selected elements of an example embodiment of an in-band OSNR monitor 300 are depicted. As shown, in-band OSNR monitor 300 may represent an embodiment of in-band OSNR monitor 204 (see FIG. 2). In certain embodiments, in-band OSNR monitor 300 may be included in an OADM or a ROADM or another node in optical network 101 (see FIG. 1). It is noted that in various embodiments, in-band OSNR monitor 300 may be implemented with additional or fewer elements than depicted in the exemplary embodiment shown in FIG. 3.

In FIG. 3, in-band OSNR monitor 300 includes tunable optical filter 306, which receives input power tap signal 216, described previously. Tunable optical filter 306 may be tuned to select a desired channel in input power tap signal 216 for OSNR monitoring. As shown, tunable optical filter 306 is coupled to controller 330, which may send a tuning command or signal to tunable optical filter 306. Tunable optical filter 306 may be tuned to a desired center frequency and may have a fixed bandwidth or a tunable bandwidth. Tunable optical filter 306 may be implemented using a variety of suitable technologies, such as a microelectromechanical system (MEMS), integrated mirrors, liquid crystal on silicon (LCoS), a prism, a fiber grating, a waveguide grating, a Fabry-Perot interferometer, a thin film, among others. In in-band OSNR monitor 300, the optical output from tunable optical filter 306, referred to herein as an in-band signal 320, is fed to photo-detector 308, which generates an electrical power signal 322 indicative of the optical power in the in-band signal. Photo-detector 308 may be direct current (DC) coupled and may have an operational bandwidth of less than 1 GHz. Photo-detector 308 may be suitable for detecting even very low power optical signals with generation of negligible electrical noise. Electrical power signal 322 is, in turn, fed to electrical amplifier 310, which generates an amplified power signal 324. Amplifier 310 may exhibit low intrinsic electrical noise. Amplified power signal 324 is acquired and digitized by analog to digital converter (ADC) 312 (also referred to as a digitizer) to generate power waveform data 326. ADC 312 may be operated at sampling rates around 10 megasamples per second (MS/s) or lower and may have a resolution of 8-bit or greater.

An input range of ADC 312 may be matched to an output range of amplifier 310 for optical analog-to-digital conversion. Power waveform data 326 are processed by digital signal processor (DSP) 314, which may output OSNR 328 to controller 330. In operation, controller 330 may direct or program tunable optical filter 306 to scan a passband corresponding to a selected optical channel in power tap signal 216. As the passband is scanned by tunable optical filter 306, photo-detector 308 generates electrical power signal 322 over the passband, which is amplified by amplifier 310. Then, ADC 312 digitizes amplified power signal 324 over the passband to generate power waveform data 326. Power waveform data 326 will include signal power and noise power within the passband corresponding to the selected optical channel, referred to as in-band noise monitoring. DSP 314 may calculate low-pass filtered power, $P_{LPF}$, and band-pass filtered power, $P_{BPF}$ from power waveform data 326 to calculate OSNR 328, for example using Equations 1 and 2 as described above. Furthermore, controller 330 may communicate measured OSNR to external systems, for example for network monitoring and control. In given embodiments, controller 330 may be in communication with control system 700 in FIG. 7.

Figure 4A:
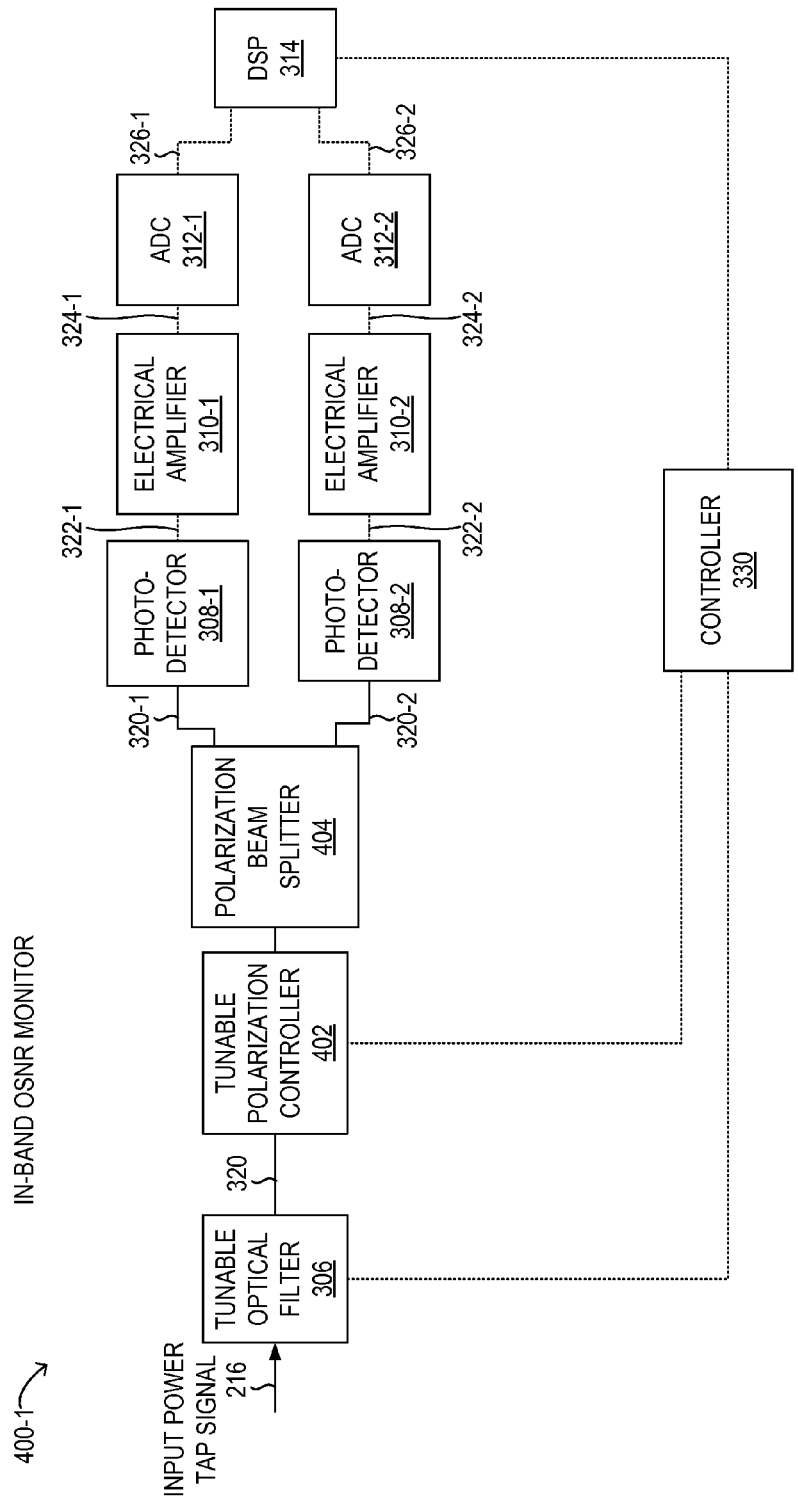
FIG. 4A is a block diagram of selected elements of an embodiment of an in-band OSNR monitor.

Referring now to FIG. 4A, selected elements of an example embodiment of an in-band OSNR monitor 400-1 are depicted. As shown, in-band OSNR monitor 400-1 may represent an embodiment of in-band OSNR monitor 204 (see FIG. 2). In certain embodiments, in-band OSNR monitor 400-1 may be included in an OADM or a ROADM or another node in optical network 101 (see FIG. 1). It is noted that in various embodiments, in-band OSNR monitor 400-1 may be implemented with additional or fewer elements than depicted in the exemplary embodiment shown in FIG. 4A.

In FIG. 4A, power tap signal 216 is assumed to be dual polarized with an X-polarization component and a Y-polarization component. Thus, in-band signal 320 includes the X-polarization component and the Y-polarization component, which tunable polarization controller 402 aligns to fixed axes of polarization beam splitter 404, resulting in first in-band signal 320-1 and second in-band signal 320-2, which are respectively processed as described above with respect to FIG. 3 along two parallel electrical signal paths, referred to herein as a parallel dual-polarized architecture. The first electrical signal path comprises photo-detector 308-1, electrical amplifier 310-1, and ADC 312-1, while the second electrical signal path comprises photo-detector 308-2, electrical amplifier 310-2, and ADC 312-2. Photo-detector 308-1 receives first in-band signal 320-1 and outputs first electrical power signal 322-1. Electrical amplifier 320-1 receives first electrical power signal 322-1 and outputs first amplified power signal 324-1. ADC 312-1 receives first amplified power signal 324-1 and outputs first power waveform data 326-1. Meanwhile, photo-detector 308-2 receives second in-band signal 320-2 and outputs second electrical power signal 322-2. Electrical amplifier 320-2 receives second electrical power signal 322-2 and outputs second amplified power signal 324-2. ADC 312-2 receives second amplified power signal 324-2 and outputs second power waveform data 326-2. In OSNR monitor 400-1, DSP 314 receives both first power waveform data 326-1 and second power waveform data 326-2 in parallel and generates first OSNR and second OSNR for the X-polarization component and the Y-polarization component, which are communicated to controller 330. Additionally, controller 330 may command tunable polarization controller 402 to coincide with polarization angles of the X-polarization component and the Y-polarization component.

Figure 4B:
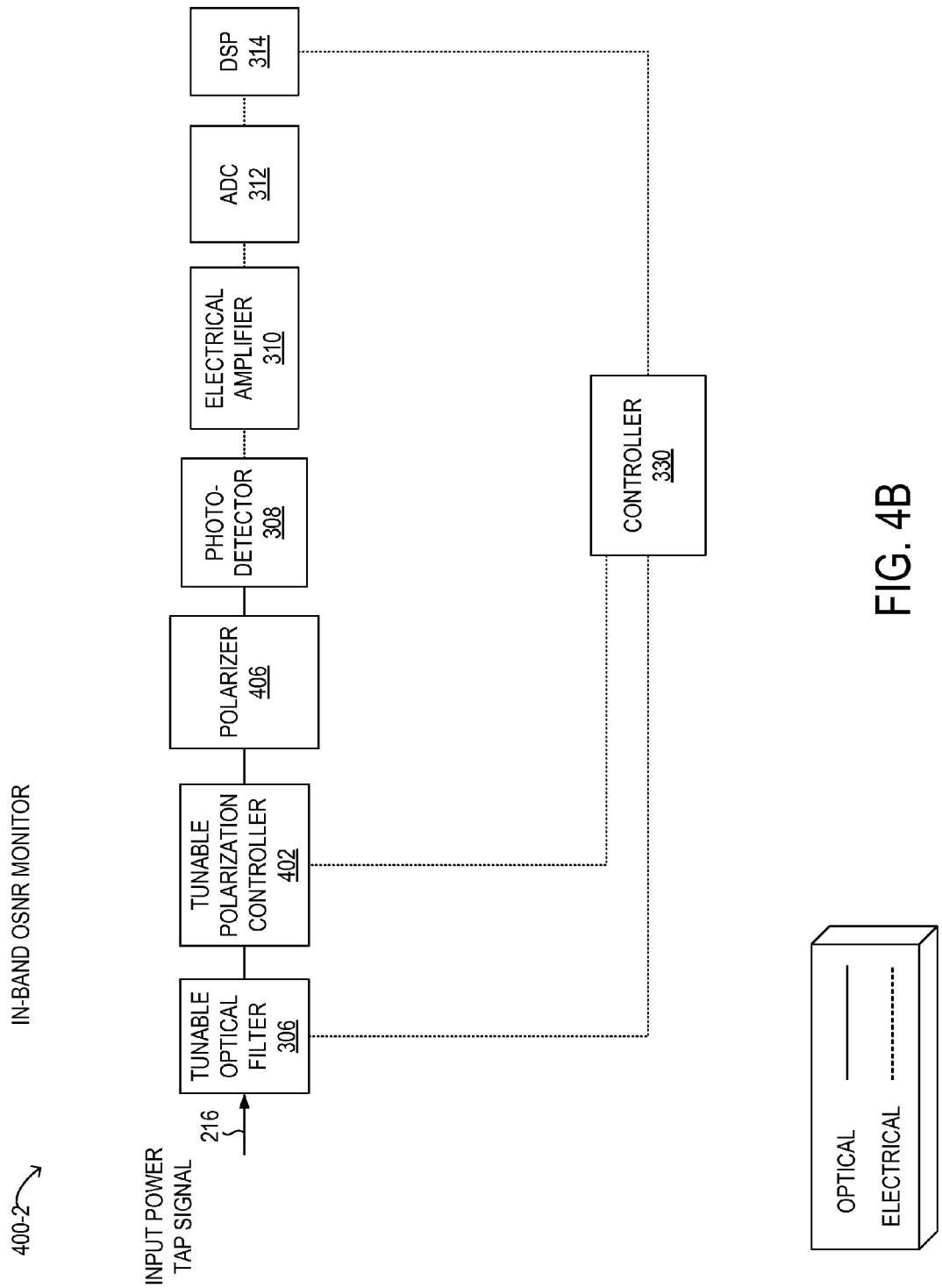
FIG. 4B is a block diagram of selected elements of an embodiment of an in-band OSNR monitor.

Referring now to FIG. 4B, selected elements of an example embodiment of an in-band OSNR monitor 400-2 are depicted. As shown, in-band OSNR monitor 400-2 may represent an embodiment of in-band OSNR monitor 204 (see FIG. 2). In certain embodiments, in-band OSNR monitor 400-2 may be included in an OADM or a ROADM or another node in optical network 101 (see FIG. 1). It is noted that in various embodiments, in-band OSNR monitor 400-2 may be implemented with additional or fewer elements than depicted in the exemplary embodiment shown in FIG. 4B.

in FIG. 4B, in-band OSNR monitor 400-2 includes tunable polarization controller 402, as described in FIG. 4A, with a polarizer 406 having a fixed polarization axis. However, in in-band OSNR monitor 400-2, controller may direct tunable polarization controller 402 to operate in a sequential alternating manner with respect to the X-polarization component and the Y-polarization component, such that each polarization component passes through polarizer 406 individually in an alternating sequential manner, referred to herein as an alternating sequential architecture. Accordingly, in-band OSNR monitor 400-2 may be implemented with fewer components, and thus, more economically than in-band OSNR monitor 400-1, but may measure OSNR more slowly. As shown, in-band OSNR monitor 400-2 includes photo-detector 308, electrical amplifier 310, ADC 312, and DSP 314, which operate as described previously. DSP 314 may output the first OSNR and the second OSNR in the alternating sequential manner.

Figure 5A:
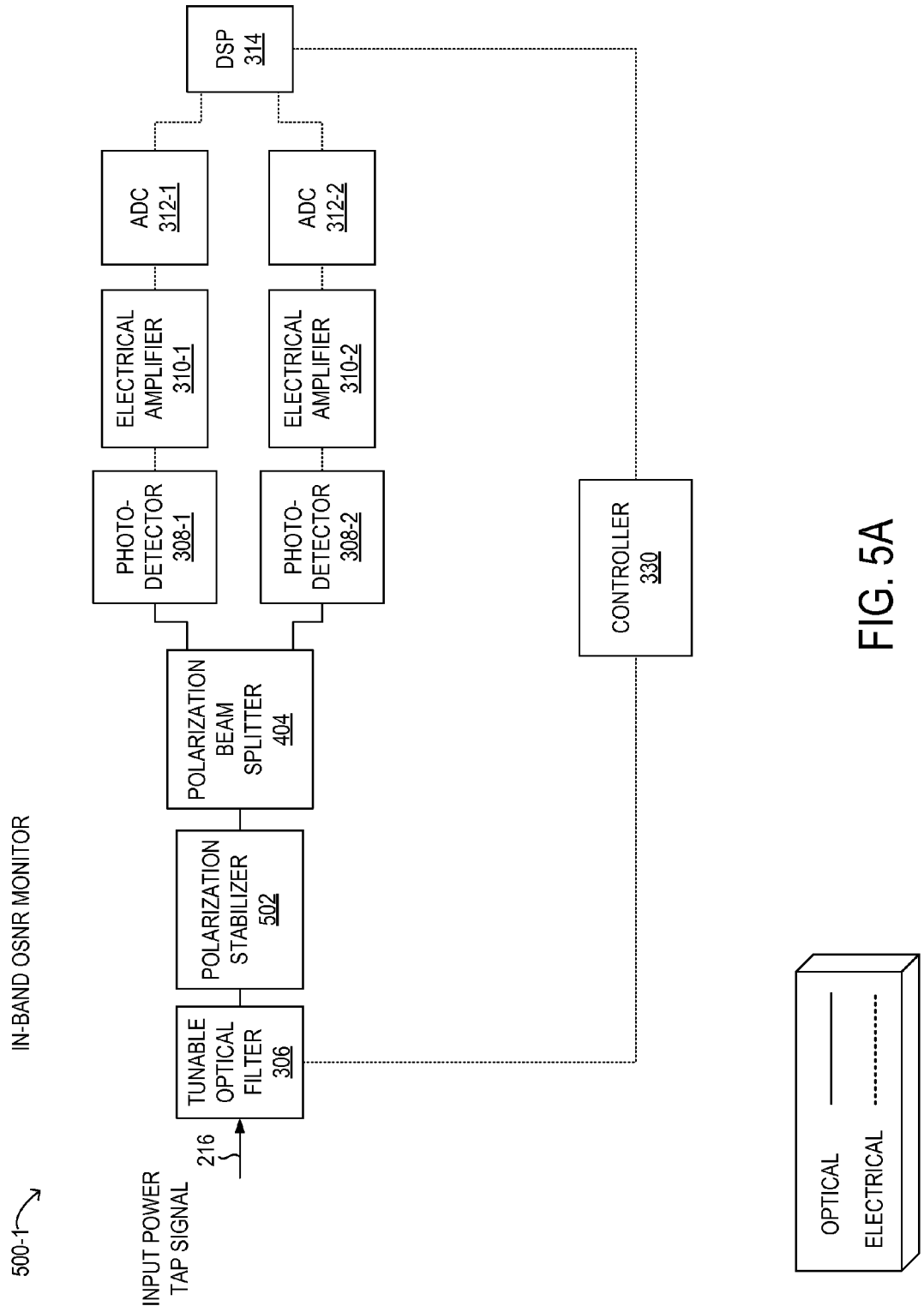
FIG. 5A is a block diagram of selected elements of an embodiment of an in-band OSNR monitor.

Referring now to FIG. 5A, selected elements of an example embodiment of an in-band OSNR monitor 500-1 are depicted. As shown, in-band OSNR monitor 500-1 may represent an embodiment of in-band OSNR monitor 204 (see FIG. 2). In certain embodiments, in-band OSNR monitor 500-1 may be included in an OADM or a ROADM or another node in optical network 101 (see FIG. 1). It is noted that in various embodiments, in-band OSNR monitor 500-1 may be implemented with additional or fewer elements than depicted in the exemplary embodiment shown in FIG. 5A.

In FIG. 5A, in-band OSNR monitor 500-1 is implemented with the parallel dual-polarization architecture, as described in FIG. 4A. However, in-band OSNR monitor 500-1 includes a different polarization element, namely polarization stabilizer 502. In in-band OSNR monitor 500-1, polarization stabilizer 502 may be fixed to polarization angles of the X-polarization component and the Y-polarization component in power tap signal 216, and may operate independently of controller 330. The remaining elements in in-band OSNR monitor 500-1 may operate in a substantially similar manner as in-band OSNR monitor 400-1 described in FIG. 4A.

Figure 5B:
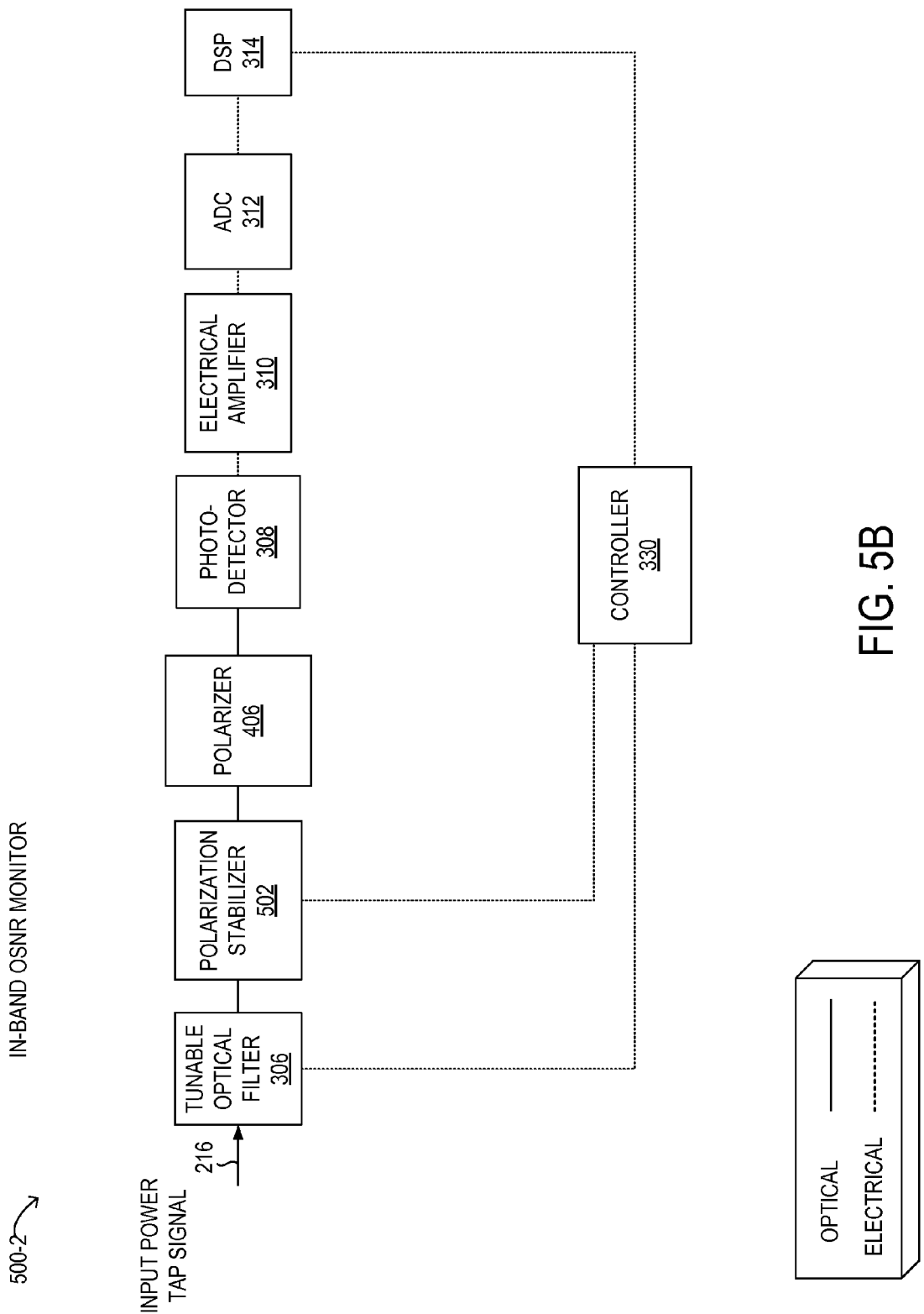
FIG. 5B is a block diagram of selected elements of an embodiment of an in-band OSNR monitor.

Referring now to FIG. 5B, selected elements of an example embodiment of an in-band OSNR monitor 500-2 are depicted. As shown, in-band OSNR monitor 500-2 may represent an embodiment of in-band OSNR monitor 204 (see FIG. 2). In certain embodiments, in-band OSNR monitor 500-2 may be included in an OADM or a ROADM or another node in optical network 101 (see FIG. 1). It is noted that in various embodiments, in-band OSNR monitor 500-2 may be implemented with additional or fewer elements than depicted in the exemplary embodiment shown in FIG. 5B.

In FIG. 5B, in-band OSNR monitor 500-2 is implemented with the alternating sequential architecture, as described in FIG. 4B. However, in-band OSNR monitor 500-2 includes polarization stabilizer 502. In in-band OSNR monitor 500-2, polarization stabilizer 502 may be controlled by controller 330 to alternate between polarization angles of the X-polarization component and the Y-polarization component in power tap signal 216 and translate those angles to the fixed axis of polarizer 406. The remaining elements in in-band OSNR monitor 500-2 may operate in a substantially similar manner as in-band OSNR monitor 400-2 described in FIG. 4B.

Figure 6A:
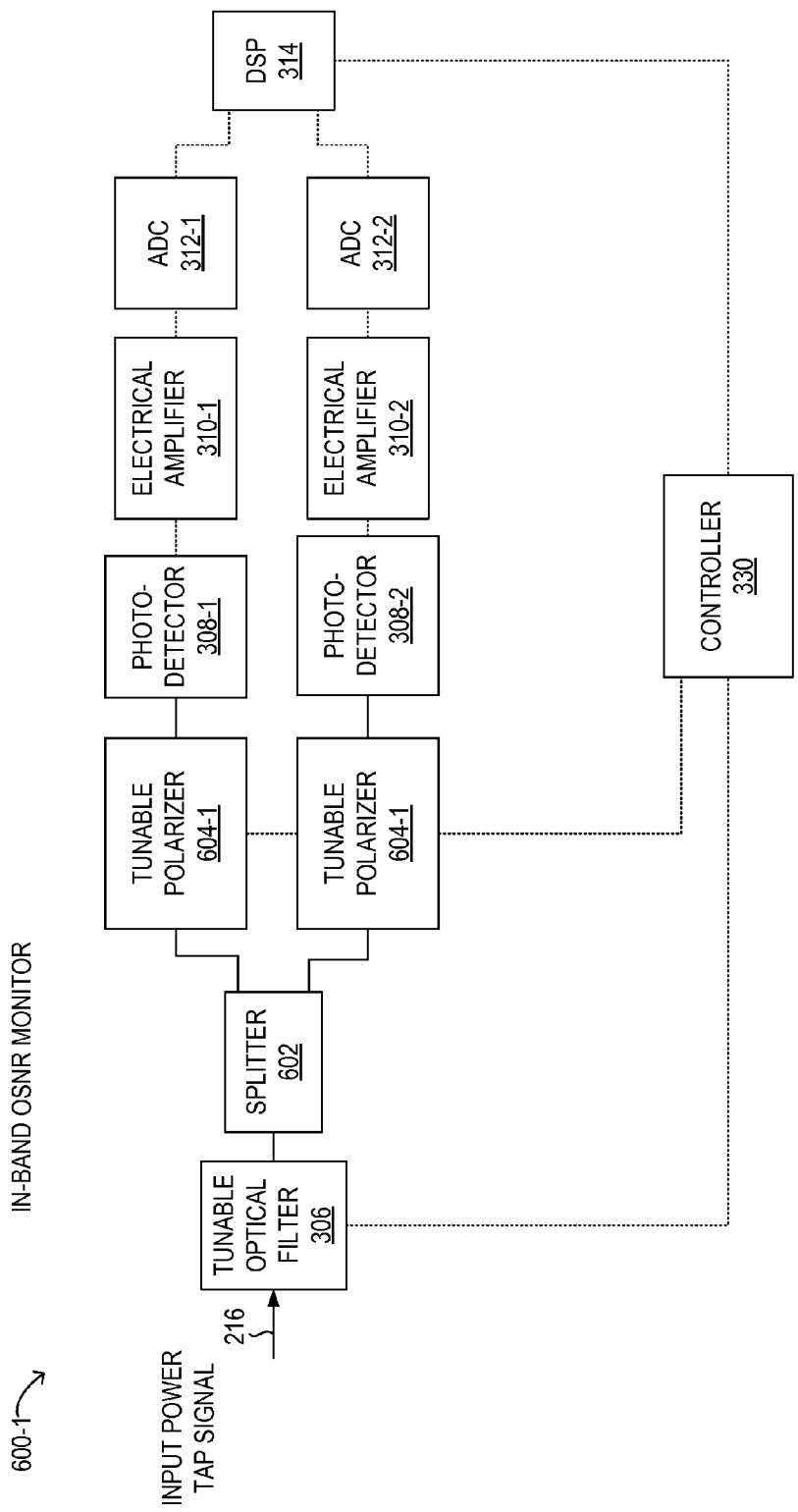
FIG. 6A is a block diagram of selected elements of an embodiment of an in-band OSNR monitor.

Referring now to FIG. 6A, selected elements of an example embodiment of an in-band OSNR monitor 600-1 are depicted. As shown, in-band OSNR monitor 600-1 may represent an embodiment of in-band OSNR monitor 204 (see FIG. 2). In certain embodiments, in-band OSNR monitor 600-1 may be included in an OADM or a ROADM or another node in optical network 101 (see FIG. 1). It is noted that in various embodiments, in-band OSNR monitor 600-1 may be implemented with additional or fewer elements than depicted in the exemplary embodiment shown in FIG. 5A.

In FIG. 6A, in-band OSNR monitor 600-1 is implemented with the parallel dual-polarization architecture, as described in FIG. 4A. However, in-band OSNR monitor 600-1 includes a different polarization arrangement with splitter 602 and tunable polarizers 604, which are fixed at polarization angles of the X-polarization component and the Y-polarization component in power tap signal 216. The polarization angles of tunable polarizers 604 may be controlled by controller 330. Tunable polarizer 604-1 is fixed according to the X-polarization component, and filters out the Y-polarization component, while tunable polarizer 604-2 is fixed according to the Y-polarization component, and filters out the X-polarization component. The remaining elements in in-band OSNR monitor 600-1 may operate in a substantially similar manner as in-band OSNR monitor 400-1 described in FIG. 4A.

Figure 6B:
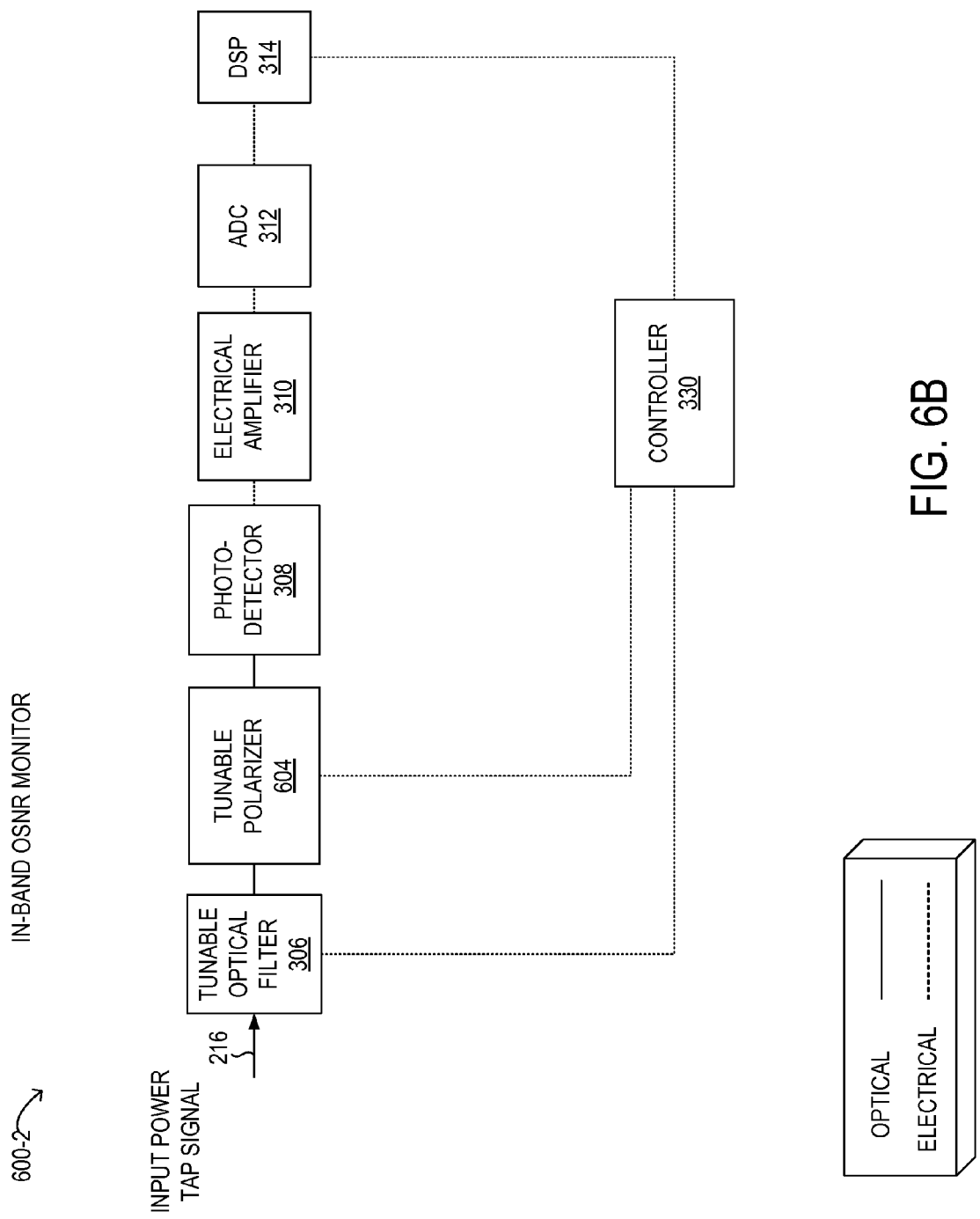
FIG. 6B is a block diagram of selected elements of an embodiment of an in-band OSNR monitor.

Referring now to FIG. 6B, selected elements of an example embodiment of an in-band OSNR monitor 600-2 are depicted. As shown, in-band OSNR monitor 600-2 may represent an embodiment of in-band OSNR monitor 204 (see FIG. 2). In certain embodiments, in-band OSNR monitor 600-2 may be included in an OADM or a ROADM or another node in optical network 101 (see FIG. 1). It is noted that in various embodiments, in-band OSNR monitor 600-2 may be implemented with additional or fewer elements than depicted in the exemplary embodiment shown in FIG. 6B.

In FIG. 6B, in-band OSNR monitor 600-2 is implemented with the alternating sequential architecture, as described in FIG. 4B. However, in-band OSNR monitor 500-2 includes tunable polarizer 604, which may alternate between the polarization angles of the X-polarization component and the Y-polarization component in power tap signal 216. The polarization angles of tunable polarizer 604 may be controlled by controller 330 to operate in the alternating sequential manner described previously. The remaining elements in in-band OSNR monitor 600-2 may operate in a substantially similar manner as in-band OSNR monitor 400-1 described in FIG. 4A.

Figure 7:
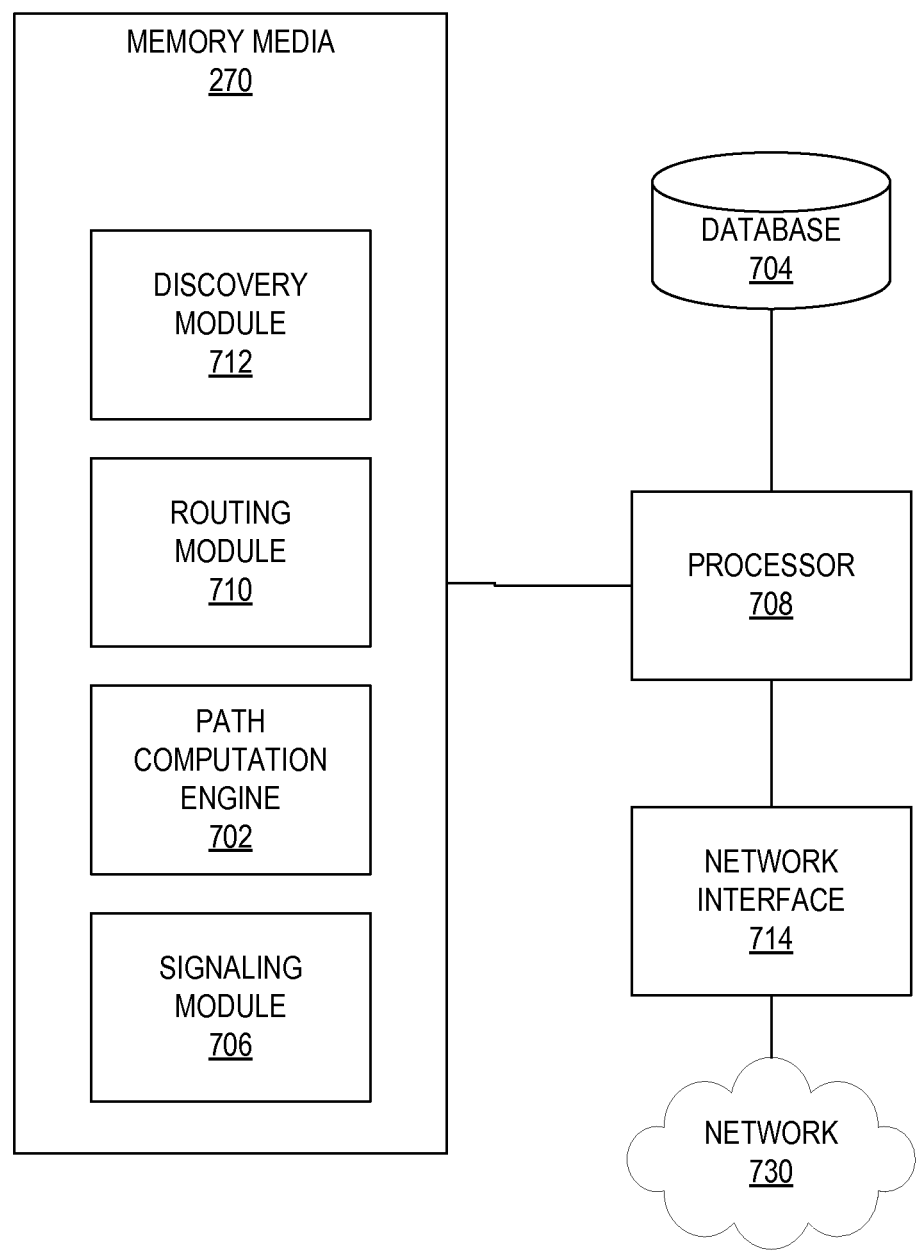
FIG. 7 is a block diagram of selected elements of an embodiment of a control system for an optical network.

Referring now to FIG. 7, a block diagram of selected elements of an embodiment of control system 700 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 700 may work together to automatically establish services within the optical network. Discovery module 712 may discover local links connecting to neighbors. Routing module 710 may broadcast local link information to optical network nodes while populating database 704. When a request for service from the optical network is received, path computation engine 702 may be called to compute a network path using database 704. This network path may then be provided to signaling module 706 to establish the requested service.

As shown in FIG. 7, control system 700 includes processor 708 and memory media 720, which may store executable instructions (i.e., executable code) that may be executable by processor 708, which has access to memory media 720. Processor 708 may execute instructions that cause control system 700 to perform the functions and operations described herein. For the purposes of this disclosure, memory media 720 may include non-transitory computer-readable media that stores data and instructions for at least a period of time. Memory media 720 may comprise persistent and volatile media, fixed and removable media, and magnetic and semiconductor media. Memory media 720 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 720 is operable to store instructions, data, or both. Memory media 720 as shown includes sets or sequences of instructions that may represent executable computer programs, namely, path computation engine 702, signaling module 706, discovery module 712, and routing module 710.

Also shown included with control system 700 in FIG. 7 is network interface 714, which may be a suitable system, apparatus, or device operable to serve as an interface between processor 708 and network 730. Network interface 714 may enable control system 700 to communicate over network 730 using a suitable transmission protocol or standard. In some embodiments, network interface 714 may be communicatively coupled via network 730 to a network storage resource. In some embodiments, network 730 may be an embodiment of at least certain portions of optical network 101. Network 730 may also include certain portions of a network using galvanic or electronic media. In certain embodiments, network 730 may include at least certain portions of a public network, such as the Internet. Network 730 may be implemented using hardware, software, or various combinations thereof.

In certain embodiments, control system 700 may be configured to interface with a person (i.e., a user) and receive data about the optical signal transmission path. For example, control system 700 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 700 may be configured to receive data about the optical signal transmission path from a device such as another computing device or a network element, for example via network 730.

As shown in FIG. 7, in some embodiments, discovery module 712 may be configured to receive data concerning an optical signal transmission path in an optical network and may be responsible for discovery of neighbors and links between neighbors. In other words, discovery module 712 may send discovery messages according to a discovery protocol, and may receive data about the optical signal transmission path. In some embodiments, discovery module 712 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 7, routing module 710 may be responsible for propagating link connectivity information to various nodes within an optical network, such as optical network 101. In particular embodiments, routing module 710 may populate database 704 with resource information to support traffic engineering, which may include link bandwidth availability. Accordingly, database 704 may be populated by routing module 710 with information usable to determine a network topology of an optical network.

Path computation engine 702 may be configured to use the information provided by routing module 710 to database 704 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 702 may consider the interplay between the transmission degradation factors. In various embodiments, path computation engine 702 may generate values for specific transmission degradation factors. Path computation engine 702 may further store data describing the optical signal transmission path in database 704.

In FIG. 7, signaling module 706 may provide functionality associated with setting up, modifying, and tearing down end-to-end networks services in an optical network, such as optical network 101. For example, when an ingress node in the optical network receives a service request, control system 100 may employ signaling module 706 to request a network path from path computation engine 702 that may be optimized according to different criteria, such as bandwidth, cost, etc. When the desired network path is identified, signaling module 706 may then communicate with respective nodes along the network path to establish the requested network services. In different embodiments, signaling module 706 may employ a signaling protocol to propagate subsequent communication to and from nodes along the network path.

In operation of control system 700, controller 330 in the in-band OSNR monitors described previously may communicate measured OSNR to control system 700 for network monitoring and control operations.

Figure 8:
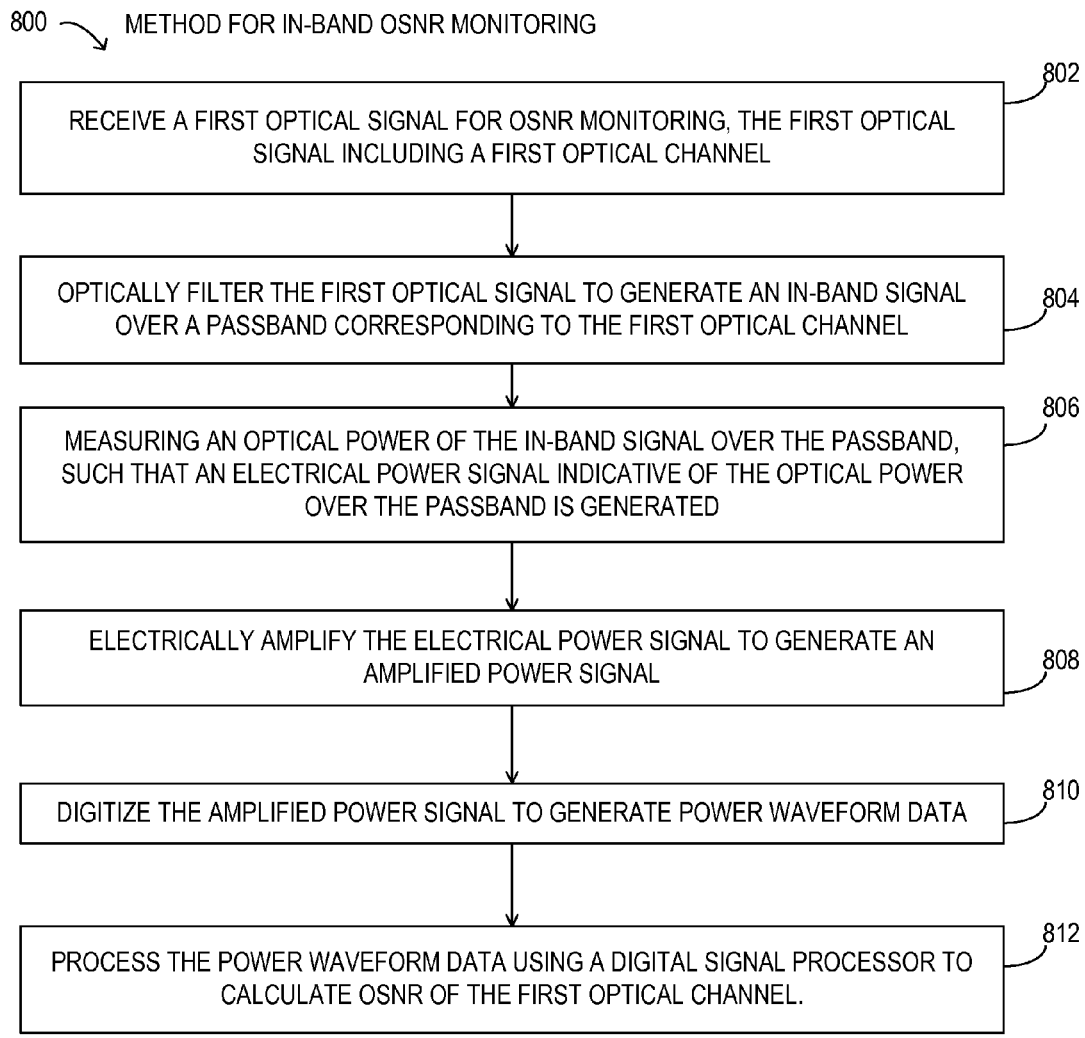
FIG. 8 is a flow diagram of selected elements of an embodiment of a method for in-band OSNR monitoring.

Referring now to FIG. 8, a block diagram of selected elements of an embodiment of method 800 for in-band OSNR monitoring, as described herein, is depicted in flowchart form. Method 800 may be performed using in-band OSNR monitor 204. It is noted that certain operations described in method 800 may be optional or may be rearranged in different embodiments.

Method 800 may begin by receiving (operation 802) a first optical signal for OSNR monitoring, the first optical signal including a first optical channel. The first optical signal is optically filtered (operation 804) to generate an in-band signal over a passband corresponding to the first optical channel. An optical power of the in-band signal over is measured (operation 806) the passband, such that an electrical power signal indicative of the optical power over the passband is generated. The electrical power signal is electrically amplified (operation 808) to generate an amplified power signal. The amplified power signal is digitized (operation 810) to generate power waveform data. The power waveform data is processed (operation 812) using a digital signal processor to calculate OSNR of the first optical channel.

As disclosed herein, methods and systems for in-band OSNR monitoring include a tunable optical filter to scan a passband of a desired optical channel. The optical power over the passband is measured and digitized to power waveform data. The power waveform data is processed with a digital signal processor to calculate OSNR. Additionally, various implementations accommodate dual polarization modulation formats using a parallel architecture and an alternating sequential architecture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for monitoring optical signal-to-noise ratio (OSNR) in optical signals, the method comprising:
receiving a first optical signal for OSNR monitoring, the first optical signal including a first optical channel;
optically filtering the first optical signal to generate an in-band signal over a passband corresponding to the first optical channel;
measuring an optical power of the in-band signal over the passband, wherein an electrical power signal indicative of the optical power over the passband is generated;
electrically amplifying the electrical power signal to generate an amplified power signal;
digitizing the amplified power signal to generate power waveform data; and processing the power waveform data using a digital signal processor to calculate OSNR of the first optical channel, wherein the first optical signal is modulated using orthogonal dual-polarization modulation including an X-polarization component and a Y-polarization component, and further comprising:

after the optically filtering, optically selecting, in a sequential alternating manner, one of the X-polarization component and the Y-polarization component for the in-band signal;

generating, in the sequential alternating manner, first power waveform data for the X-polarization component and second power waveform data for the Y-polarization component; and processing the first power waveform data and the second power waveform data using the digital signal processor to calculate first OSNR for the X-polarization component and second OSNR for the Y-polarization component.

2. An optical signal-to-noise ratio (OSNR) monitor, comprising:

a tunable optical filter to:
receive a first optical signal for OSNR monitoring, the first optical signal including a first optical channel, wherein the first optical signal is modulated using orthogonal dual-polarization modulation including an X-polarization component and a Y-polarization component; and
optically filter the first optical signal to generate an in-band signal over a passband corresponding to the first optical channel;

a polarization element to:
receive the output of the optical filter; and
optically separate the X-polarization component and the Y-polarization component;

a first photo-detector to:
sample a first optical power of the in-band signal over the passband for the X-polarization component; and
respectively generate a first electrical power signal indicative of the first optical power over the passband for the X-polarization component;

a second photo-detector to:
sample a second optical power of the in-band signal over the passband for the Y-polarization component; and
generate a second electrical power signal indicative of the second optical power over the passband for the Y-polarization component;

a first amplifier to:
electrically amplify the first electrical power signal for the X-polarization component; and
generate a first amplified power signal for the X-polarization;

a second amplifier to:
electrically amplify the second electrical power signal for the Y-polarization component; and
generate a second amplified power signal for the Y-polarization component;

a first digitizer to generate first power waveform data from the amplified power signal for the X-polarization component;

a second digitizer to generate second power waveform data from the amplified power signal for the Y-polarization component; and a digital signal processor to:
process the first power waveform data and the second power waveform data;
calculate a first OSNR for the X-polarization component; and
calculate a second OSNR for the Y-polarization component, wherein the polarization element is further configured to:
after the optically filtering, optically select, in a sequential alternating manner, one of the X-polarization component and the Y-polarization component for the in-band signal;
wherein the digitizer is to generate, in the sequential alternating manner, first power waveform data for the X-polarization component and second power waveform data for the Y-polarization component; and
wherein the digital signal processor is to:
process the first power waveform data and the second power waveform data;
calculate a first OSNR for the X-polarization component; and
calculate a second OSNR for the Y-polarization component.

3. An optical communication system comprising:
a transmitter to transmit an optical signal over an optical signal transmission path;
a receiver to receive the optical signal from the optical signal transmission path; and
an optical signal-to-noise ratio (OSNR) monitor, further comprising:
a tunable optical filter to:
receive a first optical signal for OSNR monitoring, the first optical signal including a first optical channel; and
optically filter the first optical signal to generate an in-band signal over a passband corresponding to the first optical channel;
a photo-detector to:
sample an optical power of the in-band signal over the passband; and
generate an electrical power signal indicative of the optical power over the passband;
an amplifier to:
electrically amplify the electrical power signal; and
generate an amplified power signal;
a digitizer to generate power waveform data from the amplified power signal; and
a digital signal processor to:
process the power waveform data; and
calculate OSNR of the first optical channel, wherein the first optical signal is modulated using orthogonal dual-polarization modulation including an X-polarization component and a Y-polarization component, and further comprising:
a polarization element to:
after the optically filtering, optically select, in a sequential alternating manner, one of the X-polarization component and the Y-polarization component for the in-band signal;
wherein the digitizer is to generate, in the sequential alternating manner, first power waveform data for the X-polarization component and second power waveform data for the Y-polarization component; and
wherein the digital signal processor is to:
process the first power waveform data and the second power waveform data;
calculate a first OSNR for the X-polarization component; and
calculate a second OSNR for the Y-polarization component.

* * * * *